US 8,418,657 B2

(12) United States Patent
Dixon et al.

(10) Patent No.: US 8,418,657 B2
(45) Date of Patent: Apr. 16, 2013

(54) PET AMUSEMENT DEVICE WITH BALL TRACK AND CATNIP RECEPTACLE

(75) Inventors: Kirk Dixon, Claremore, OK (US); Tibor Siklosi, Grove, OK (US); David Price, Miami, OK (US)

(73) Assignee: Bergan, LLC, Monkey Island, OK (US)

( * ) Notice: Subject to any disclaimer, the term of this patent is extended or adjusted under 35 U.S.C. 154(b) by 176 days.

(21) Appl. No.: 13/016,632

(22) Filed: Jan. 28, 2011

(65) Prior Publication Data

US 2012/0192806 A1  Aug. 2, 2012

(51) Int. Cl.
*A01K 15/02* (2006.01)

(52) U.S. Cl.
USPC .......................................... 119/711; 119/707

(58) Field of Classification Search .................. 119/707, 119/702, 706, 709, 710, 711; 446/168, 170; D30/160
See application file for complete search history.

(56) References Cited

U.S. PATENT DOCUMENTS

| | | | | |
|---|---|---|---|---|
| 3,502,335 | A * | 3/1970 | Sholin | 473/588 |
| D273,314 | S * | 4/1984 | McCoy et al. | D21/694 |
| 4,722,299 | A * | 2/1988 | Mohr | 119/707 |
| D303,713 | S * | 9/1989 | Kelm et al. | D24/117 |
| 5,009,193 | A * | 4/1991 | Gordon | 119/711 |
| D335,553 | S * | 5/1993 | Conner | D30/160 |
| 5,269,261 | A | 12/1993 | McCance | |
| D345,633 | S * | 3/1994 | McCance | D30/160 |
| D359,822 | S * | 6/1995 | McCance | D30/160 |
| 5,517,948 | A * | 5/1996 | Udelle et al. | 119/706 |
| 5,529,017 | A * | 6/1996 | Udelle et al. | 119/707 |
| 5,540,187 | A * | 7/1996 | Udelle et al. | 119/706 |
| 5,544,623 | A * | 8/1996 | Udelle et al. | 119/706 |
| 5,572,955 | A * | 11/1996 | Boshears | 119/706 |
| 5,579,725 | A * | 12/1996 | Boshears | 119/706 |
| 5,680,831 | A * | 10/1997 | Udelle | 119/609 |
| 5,785,005 | A * | 7/1998 | Udelle et al. | 119/706 |
| 5,809,938 | A * | 9/1998 | Baiera et al. | 119/707 |
| D405,563 | S * | 2/1999 | Baiera et al. | D30/160 |
| 6,405,692 | B1 * | 6/2002 | Christiansen | 123/65 BA |
| 7,320,296 | B2 * | 1/2008 | Morrison | 119/707 |
| 7,806,087 | B2 * | 10/2010 | Plante | 119/707 |
| D656,282 | S * | 3/2012 | Dixon et al. | D30/160 |
| 2009/0095229 | A1 * | 4/2009 | Plante | 119/707 |

* cited by examiner

*Primary Examiner* — T. Nguyen
(74) *Attorney, Agent, or Firm* — Head, Johnson & Kachigian, PC

(57) ABSTRACT

A pet amusement device comprising: a receptacle for catnip; a continuous track surrounding the catnip receptacle; a toy, such as a ball, contained within the continuous track such that the toy may travel along the continuous track; and at least one opening along the continuous track such that the continuous track and the toy are accessible through the at least one opening. The catnip receptacle may have a cap allowing a user to easily add catnip to the receptacle and allowing the scent of the catnip to exit the receptacle. In use, a pet, such as a cat, may smell the catnip and bat the ball around the continuous track. The pet amusement device may be combined with another device with a larger continuous track to produce a device with two concentric tiered tracks in addition to the catnip receptacle.

21 Claims, 4 Drawing Sheets

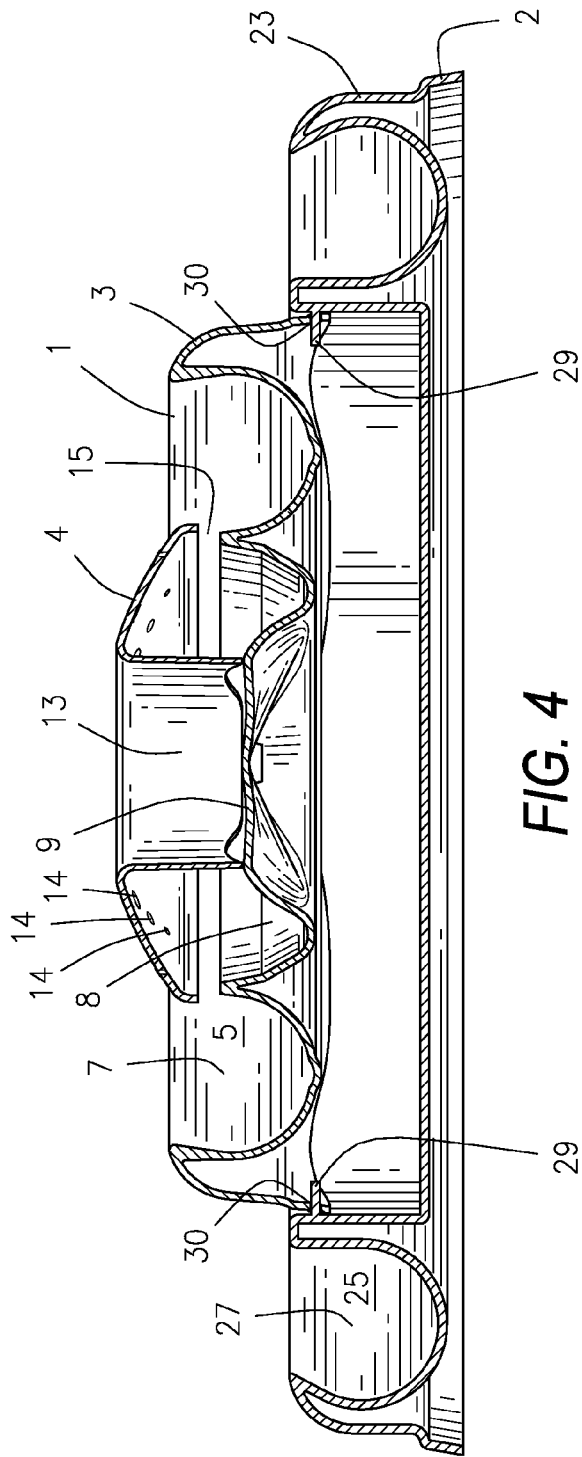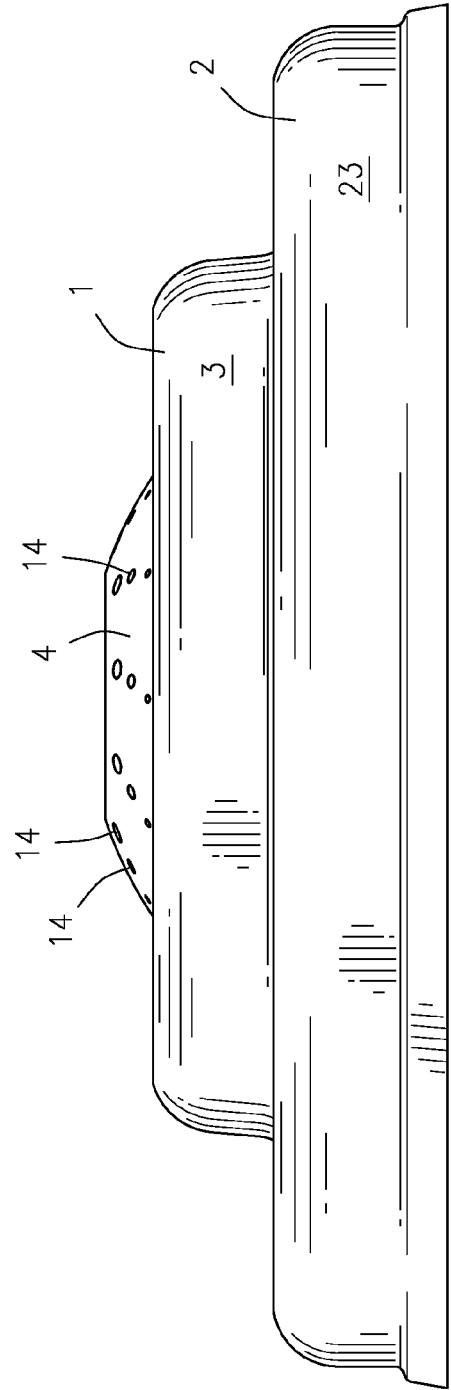

PET AMUSEMENT DEVICE WITH BALL TRACK AND CATNIP RECEPTACLE

CROSS REFERENCE

Not Applicable.

BACKGROUND OF THE INVENTION

1. Field of the Invention

This invention relates generally to a pet amusement device, and more particularly, but not by way of limitation, to a pet amusement device with ball track and catnip receptacle.

2. Description of the Related Art

Pets, particularly cats, enjoy batting balls about. Pet amusement devices providing a contained area in which a ball may be batted, such as a continuous track, are particularly desirable.

Additionally, many cats are stimulated by the scent of catnip. One theory is that catnip can stimulates a cat's pheromonic receptors, which may result in temporary euphoria.

Based on the foregoing, it is desirable to provide a pet amusement device that combines a ball on a continuous track with a receptacle for catnip.

It is further desirable to provide such a pet amusement device that may be combined with another, larger pet amusement device with a ball on a continuous track to allow for a combined device with two balls on two separate tracks in addition to the catnip receptacle.

SUMMARY OF THE INVENTION

In general, in a first aspect, the invention relates to a pet amusement device comprising a base and a cap. The base comprises: a receptacle; a continuous track surrounding the receptacle; a toy contained within the continuous track such that the toy may travel along the continuous track; and at least one opening along the continuous track such that the continuous track and the toy contained within the continuous track are accessible through the at least one opening. The cap at least partially covering the receptacle.

The toy may be a ball. The base may have a top and the at least one opening along the continuous track may be a single continuous longitudinal opening along the top of the base. The continuous track may have an arcuate cross-section; the toy may have a width; the continuous track may have a width greater than the width of the toy; and the at least one opening along the continuous track may have a width that is smaller than the width of the toy, such that the toy may freely travel along the continuous track but may not be easily removed from the continuous track through the at least one opening. The base may be made of flexible material such that the at least one opening may be expanded to allow insertion or removal of the toy through the at least one opening.

The receptacle may have a bottom surface and the bottom surface may have a raised center and an area surrounding the raised center. The cap may have one or more tabs and the raised center of the bottom surface of the receptacle may have one or more holes or indentations such that the one or more tabs of the cap may be inserted into the one or more holes or indentations of the raised center to attach the cap to the base. The raised center may have a middle and may have one or more channels angling from the middle of the raised center to the area surrounding the raised center, such that material poured onto the raised center travels along the one or more channels to the area surrounding the raised center. The cap may have an opening such that the receptacle may be accessed through the opening, where the raised center has a diameter and the opening has a diameter equal to or smaller than the diameter of the raised center such that the area surrounding the raised center may be accessed through the opening only via the one or more channels. The receptacle may have a diameter and the cap may have a diameter equal to the diameter of the receptacle such that the cap at least partially covers the receptacle without covering the continuous track surrounding the receptacle.

The cap may have one or more holes therein. The pet amusement device may further comprise catnip within the receptacle, where the one or more holes in the cap are such that scent from the catnip may exit the receptacle via the one or more holes. The pet amusement device may further comprise at least one gap between the cap and a partition in the base dividing the continuous track from the receptacle. The toy may create air currents as it travels along the continuous track and the air currents may cause scent from the catnip to exit the receptacle through the at least one gap.

The pet amusement device may further comprise a second base, where the second base comprises: an inner portion; a continuous track surrounding the inner portion; a toy contained within the continuous track such that the toy may travel along the continuous track; and at least one opening along the continuous track such that the continuous track and the toy contained within the continuous track are accessible through the at least one opening. The base may have a diameter and the inner portion of the second base may have a diameter equal to the diameter of the inner portion such that the base may be attached to the second base and cover the inner portion of the second base without covering the continuous track of the second base. The base may be raised relative to the second base such that the base and the second base form tiers.

The toy contained within the continuous track of the second base may be a ball. The second base may have a top and the at least one opening along the continuous track of the second base may be a single continuous longitudinal opening along the top of the second base. The continuous track of the second base may have an arcuate cross-section; the toy contained within the continuous track of the second base may have a width; the continuous track of the second base may have a width greater than the width of the toy contained within the continuous track of the second base; and the at least one opening along the continuous track of the second base may have a width that is smaller than the width of the toy contained within the continuous track of the second base, such that the toy contained within the continuous track of the second base may freely travel along the continuous track of the second base but may not be easily removed from the continuous track of the second base through the at least one opening of the second base. The second base may be made of flexible material such that the at least one opening in the second base may be expanded to allow insertion or removal of the toy through the at least one opening in the second base. The second base may have one or more tabs extending into the inner portion and the base may have one or more holes or indentations such that the tabs of the second base fit within the holes or indentations of the base to secure the base to the second base.

BRIEF DESCRIPTION OF THE DRAWINGS

FIG. 4 is a side cut-away view of the pet amusement device with ball track and catnip receptacle in combination with the larger pet amusement device with ball track; and FIG. 5 is a side view of the pet amusement device with ball track and catnip receptacle in combination with the larger pet amusement device with ball track.

DETAILED DESCRIPTION OF THE INVENTION

Figure 1:
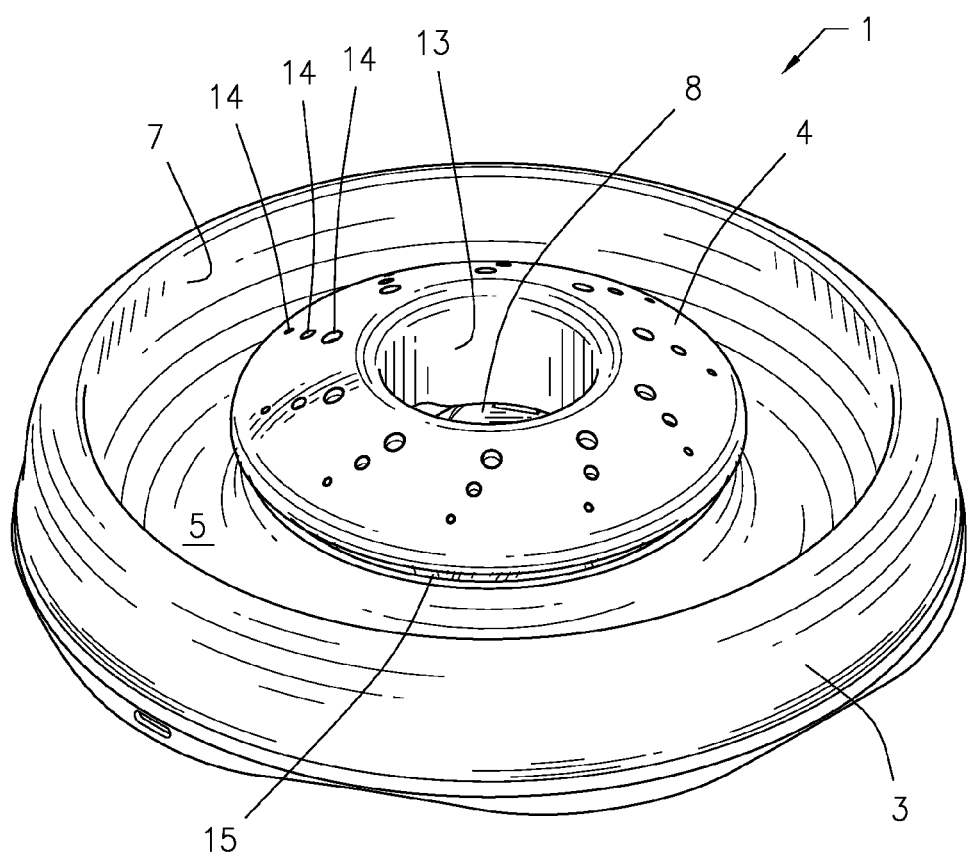
FIG. 1 is a perspective view of a pet amusement device with ball track and catnip receptacle.

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a pet amusement device 1 as shown in FIGS. 1 through 5. The pet amusement device 1 may be used alone or in conjunction with a second pet amusement device 2, as shown in FIGS. 2 through 5.

The pet amusement device 1 may comprise two parts: a base 3 and a cap 4. The base 3 may include a continuous track 5 in the form of a channel. A toy 6 may be contained within the continuous track 5 such that the toy 6 may freely travel along the continuous track 5. The toy 6 may be a ball with a typical spherical shape or may have any other shape that allows the toy 6 to roll or slide along the continuous track 5. The continuous track 5 may be circular or have any other appropriate shape.

Figure 2:
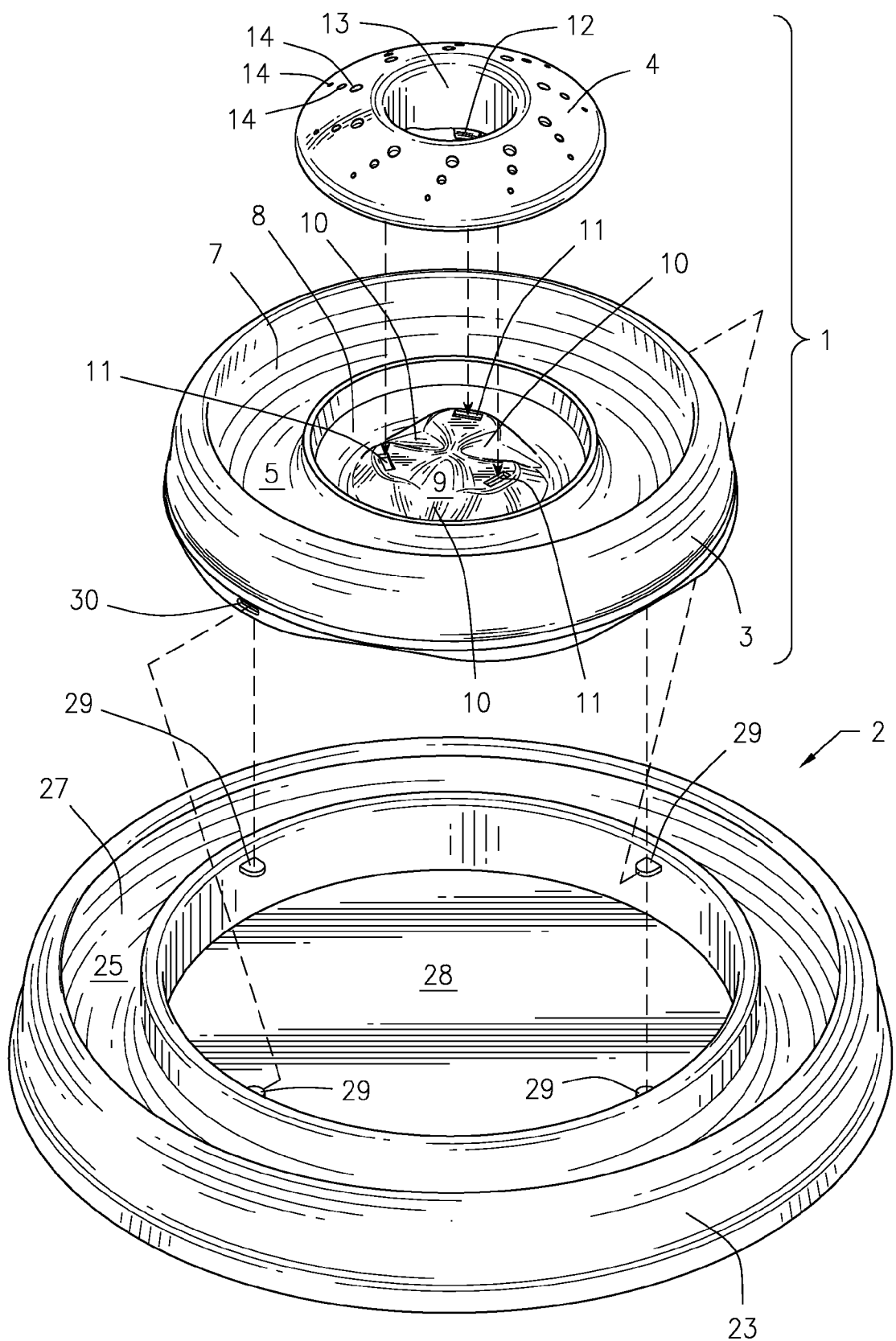
FIG. 2 is an exploded view of the pet amusement device with ball track and catnip receptacle in combination with a larger pet amusement device with ball track.
Figure 3:
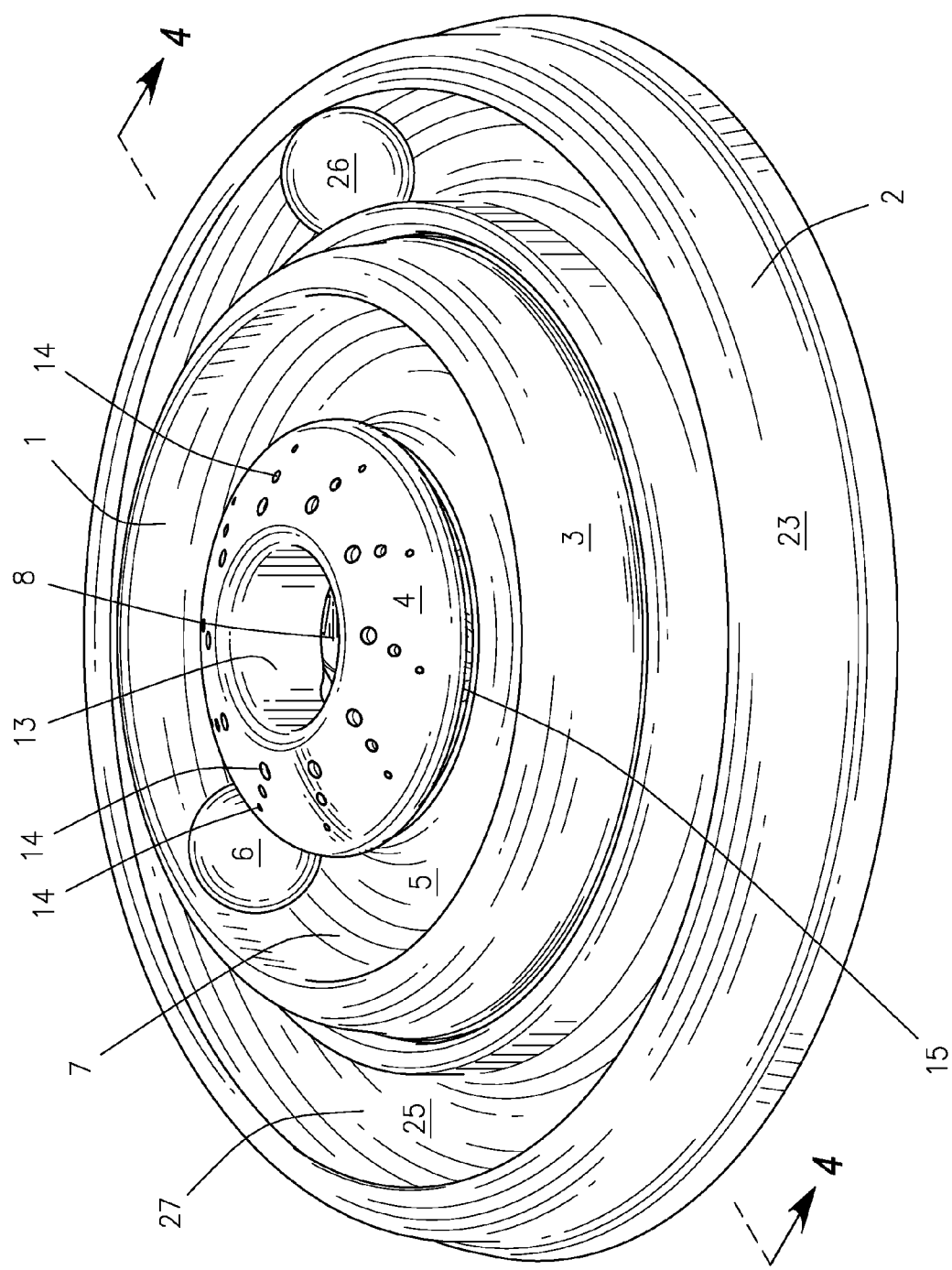
FIG. 3 is a perspective view of the pet amusement device with ball track and catnip receptacle in combination with the larger pet amusement device with ball track.

The base 3 may include one or more openings 7 along the continuous track 5 such that the continuous track 5 and any toy 6 contained within the continuous track 5 may be accessible through the openings 7 such that a cat or other animal may bat the toy 6 around the continuous track 5 and watch it travel around and around the continuous track 5. The openings 7 may be along the top of the base 3, along the sides of the base 3, along the bottom of base 3, or any combination thereof. The openings 7 may be a single continuous longitudinal opening along the top of the base 3, as shown in FIGS. 1 through 3.

The continuous track 5 may have an arcuate cross-section, as seen in FIG. 4. The openings 7 may be of sufficient width to allow entry of the paw of a cat or other animal through the openings 7 to allow the cat or other animal to bat the toy 6 along the continuous track 5. The width of the openings 7 may be slightly smaller than the width of the toy 6. Thus, the toy 6 may freely roll or slide along the continuous track 5 but may not be easily removed from the continuous track 5 through the openings 7. The base 3 may be made of slightly flexible material such that the openings 7 may be expanded slightly to allow insertion or removal of the toy 6.

The base 3 may include a receptacle 8, which may be located such that the receptacle 8 is surrounded by the continuous track 5. The receptacle 8 may be circular, as shown in FIG. 2, particularly if the continuous track 5 is circular. The bottom of the receptacle 8 may have a raised center 9. The raised center 9 may slope toward the edges of the bottom of the receptacle 8. The raised center 9 may have channels 10 therein, such that material poured onto the raised center 9 would travel along the channels 10 to the edges of the bottom of the receptacle 8. The raised center 9 may have one or more holes or indentations 11.

The cap 4 may at least partially cover the receptacle 8. The cap 4 may have approximately the same diameter as the receptacle 8 such that the cap 4 may cover the receptacle 8 without covering the continuous track 5 surrounding the receptacle 8. The cap 4 may have one or more tabs 12 extending downward therefrom. The tabs 12 may fit within the holes or indentations 11, thus securing the cap 4 in place relative to the base 3. Additionally or alternately, the cap 4 may attach to the raised center 9 via any other suitable attachment device or devices. Additionally or alternately, the cap 4 may attach to the base 3 along the sides of the receptacle 8. The cap 4 may be removably attached to the base 3.

The cap 4 may have an opening 13 therethrough such that the receptacle 8 may be accessed through the opening 13. Thus, if the receptacle 8 is circular, the cap 4 may be annular. The opening 13 may have a similar or smaller diameter to that of the raised center 9 of the receptacle 8 such that the edges of the bottom of the receptacle 8 may be accessed only via the channels 10 in the raised center 9. In use, a user may pour catnip through the opening 13 in the cap 4 while the cap 4 is in place over the receptacle 8. The catnip would travel along the channels 10 and come to rest along the edges of the bottom of the receptacle 8 in close proximity to the continuous track 5. The channels 10 may be generally narrower than a cat's paw such that a cat would not have easy access to the catnip resting along the edges of the bottom of the receptacle 8.

The cap 4 may have one or more holes 14 therein such that the scent from any catnip contained within the receptacle 8 may exit the receptacle through the holes 14. The one or more holes 14 may be small enough that the catnip itself cannot exit the receptacle through the holes 14 should the pet amusement device 1 be turned upside down. The cap 4 may be sized such that there is at least one gap 15 between the bottom of the cap 4 and the top of the sides of the receptacle 8. The gap 15 further allows the scent from the catnip contained within the receptacle 8 to exit the receptacle 8.

In use, when the toy 6 travels along the continuous track 5, the movement of the toy 6 may create circular air currents above the pet amusement device 1. These circular air currents may promote the dispersal of the scent of the catnip. In particular, the catnip is located along the edges of the bottom of the receptacle 8, which is in close proximity to the gap 15 and the continuous track 5. As the toy 6 rotates around the continuous track 5, it creates a low pressure zone behind the toy 6 and a high pressure zone ahead of the toy 6. This causes air currents to be introduced in the gap 15 between the cap 4 and the base 3, which wafts the scent of the catnip from the receptacle 8 into the continuous track 5 and lofts the scent into the air surrounding the pet amusement device 1.

The pet amusement device 1 may be used alone or in conjunction with a second pet amusement device 2, as shown in FIGS. 2 through 5. The second amusement device 2 may comprise a base 23. The base 23 may include a continuous track 25 in the form of a channel. A toy 26 may be contained within the continuous track 25 such that the toy 26 may freely travel along the continuous track 25. The toy 26 may be a ball with a typical spherical shape or may have any other shape that allows the toy 26 to roll or slide along the continuous track 25. The continuous track 25 may be circular or have any other appropriate shape.

The base 23 may include one or more openings 27 along the continuous track 25 such that the continuous track 25 and any toy 26 contained within the continuous track 25 may be accessible through the openings 27 such that a cat or other animal may bat the toy 26 around the continuous track 25 and watch it travel around and around the continuous track 25. The openings 27 may be along the top of the base 23, along the sides of the base 23, along the bottom of base 23, or any combination thereof. The openings 27 may be a single continuous longitudinal opening along the top of the base 23, as shown in FIGS. 2 and 3.

The continuous track 25 may have an arcuate cross-section, as seen in FIG. 4. The openings 27 may be of sufficient width to allow entry of the paw of a cat or other animal through the openings 27 to allow the cat or other animal to bat the toy 26 along the continuous track 25. The width of the openings 27 may be slightly smaller than the width of the toy 26. Thus, the toy 26 may freely roll or slide along the continuous track 25 but may not be easily removed from the continuous track 25 through the openings 27. The base 23 may be made of slightly flexible material such that the openings 27 may be expanded slightly to allow insertion or removal of the toy 26.

The base 23 may have an inner portion 28, where the continuous track 25 surrounds the inner portion 28. The inner portion 28 may have a flat bottom, an upstanding rim extending from the bottom, and an open top. The diameter of the inner portion 28 may be approximately the same as the diameter of the base 3 of the pet amusement device 1. The pet amusement device 1 may attach to the second pet amusement device 2 such that base 3 covers the inner portion 28 but does not cover the continuous track 25. The base 23 may have one or more tabs 29 extending into the inner portion 28. The base 3 may have one or more holes or indentations 30 such that the tabs 29 of the second pet amusement device 2 fit within the holes or indentations 30 of the pet amusement device 1, thus securing the second pet amusement device 2 to the pet amusement device 1. Additionally or alternately, the pet amusement device 1 may attach to the second pet amusement device 2 via any other suitable attachment device or devices.

Once attached, the pet amusement device 1 and the second pet amusement device 2 may combine to form a unitary deluxe pet amusement device with two continuous tracks 5 and 25 containing two toys 6 and 26, respectively, and a receptacle 8 for catnip protected by a cap 4, as seen in FIG. 3. The pet amusement device 1 may be raised relative to the pet amusement device 2, such that the pet amusement device 1 and the second pet amusement device 2 form tiers, as seen in FIG. 5.

Whereas, the devices and methods have been described in relation to the drawings and claims, it should be understood that other and further modifications, apart from those shown or suggested herein, may be made within the spirit and scope of this invention.

What is claimed is:

1. A pet amusement device comprising:
    a base, where the base comprises:
        a receptacle, where the receptacle has a bottom surface and where the bottom surface has a raised center and an area surrounding the raised center;
        a continuous track surrounding the receptacle;
        a toy contained within the continuous track such that the toy may travel along the continuous track; and
        at least one opening along the continuous track such that the continuous track and the toy contained within the continuous track are accessible through the at least one opening; and
    a cap at least partially covering the receptacle.

2. The pet amusement device of claim 1 where the toy is a ball.

3. The pet amusement device of claim 1 where the base has a top and where the at least one opening along the continuous track is a single continuous longitudinal opening along the top of the base.

4. The pet amusement device of claim 1 where:
    the continuous track has an arcuate cross-section;
    the toy has a width;
    the continuous track has a width greater than the width of the toy; and
    the at least one opening along the continuous track has a width that is smaller than the width of the toy,
such that the toy may freely travel along the continuous track but may not be easily removed from the continuous track through the at least one opening.

5. The pet amusement device of claim 4 where the base is made of flexible material such that the at least one opening may be expanded to allow insertion or removal of the toy through the at least one opening.

6. The pet amusement device of claim 1 where the cap has one or more tabs and the raised center of the bottom surface of the receptacle has one or more holes or indentations such that the one or more tabs of the cap may be inserted into the one or more holes or indentations of the raised center to attach the cap to the base.

7. The pet amusement device of claim 1 where the raised center has a middle and has one or more channels angling from the middle of the raised center to the area surrounding the raised center, such that material poured onto the raised center travels along the one or more channels to the area surrounding the raised center.

8. The pet amusement device of claim 7 where the cap has an opening such that the receptacle may be accessed through the opening, where the raised center has a diameter and the opening has a diameter equal to or smaller than the diameter of the raised center such that the area surrounding the raised center may be accessed through the opening only via the one or more channels.

9. The pet amusement device of claim 1 where the receptacle has a diameter and the cap has a diameter equal to the diameter of the receptacle such that the cap at least partially covers the receptacle without covering the continuous track surrounding the receptacle.

10. The pet amusement device of claim 1 where the cap has one or more holes therein.

11. The pet amusement device of claim 10 further comprising catnip within the receptacle, where the one or more holes in the cap are such that scent from the catnip may exit the receptacle via the one or more holes.

12. A pet amusement device comprising:
    a base, where the base comprises:
        a receptacle;
        a continuous track surrounding the receptacle;
        a toy contained within the continuous track such that the toy may travel along the continuous track; and
        at least one opening along the continuous track such that the continuous track and the toy contained within the continuous track are accessible through the at least one opening; and
    a cap at least partially covering the receptacle; and
    at least one gap between the cap and a partition in the base dividing the continuous track from the receptacle.

13. The pet amusement device of claim 12 further comprising catnip within the receptacle, such that the toy creates air currents as it travels along the continuous track and the air currents cause scent from the catnip to exit the receptacle through the at least one gap.

14. The pet amusement device of claim 1 further comprising a second base, where the second base comprises:
  an inner portion;
  a continuous track surrounding the inner portion;
  a toy contained within the continuous track such that the toy may travel along the continuous track; and
  at least one opening along the continuous track such that the continuous track and the toy contained within the continuous track are accessible through the at least one opening.

15. The pet amusement device of claim 14 where the base has a diameter and the inner portion of the second base has a diameter equal to the diameter of the inner portion such that the base is capable of being attached to the second base and covering the inner portion of the second base without covering the continuous track of the second base.

16. The pet amusement device of claim 15 where the base is raised relative to the second base such that the base and the second base form tiers.

17. The pet amusement device of claim 14 where the toy contained within the continuous track of the base is a ball and where the toy contained within the continuous track of the second base is a ball.

18. The pet amusement device of claim 14 where:
  the base has a top and the at least one opening along the continuous track of the base is a single continuous longitudinal opening along the top of the base; and
  the second base has a top and the at least one opening along the continuous track of the second base is a single continuous longitudinal opening along the top of the second base.

19. The pet amusement device of claim 14 where:
  the continuous track of the base has an arcuate cross-section;
  the continuous track of the second base has an arcuate cross-section;
  the toy contained within the continuous track of the base has a width;
  the toy contained within the continuous track of the second base has a width;
  the continuous track of the base has a width greater than the width of the toy contained within the continuous track of the base;
  the continuous track of the second base has a width greater than the width of the toy contained within the continuous track of the second base;
  the at least one opening along the continuous track of the base has a width that is smaller than the width of the toy contained within the continuous track of the base; and
  the at least one opening along the continuous track of the second base has a width that is smaller than the width of the toy contained within the continuous track of the second base,
such that the toy contained within the continuous track of the base may freely travel along the continuous track of the base but may not be easily removed from the continuous track of the base through the at least one opening of the base and the toy contained within the continuous track of the second base may freely travel along the continuous track of the second base but may not be easily removed from the continuous track of the second base through the at least one opening of the second base.

20. The pet amusement device of claim 19 where the base and the second base are made of flexible material such that the at least one opening in the base may be expanded to allow insertion or removal of the toy through the at least one opening in the base and the at least one opening in the second base may be expanded to allow insertion or removal of the toy through the at least one opening in the second base.

21. The pet amusement device of claim 14 where the second base has one or more tabs extending into the inner portion and the base has one or more holes or indentations such that the tabs of the second base fit within the holes or indentations of the base to secure the base to the second base.

* * * * *